(12) United States Patent
Parsi et al.

(10) Patent No.: US 12,360,016 B2
(45) Date of Patent: *Jul. 15, 2025

(54) MINIMALLY INVASIVE MICROSAMPLER FOR INTACT REMOVAL OF SURFACE DEPOSITS AND SUBSTRATES

(71) Applicant: Westinghouse Electric Company LLC, Cranberry Township, PA (US)

(72) Inventors: Arash Parsi, Sarver, PA (US); William A. Byers, Murrysville, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 90 days.

This patent is subject to a terminal disclaimer.

(21) Appl. No.: 18/147,932

(22) Filed: Dec. 29, 2022

(65) Prior Publication Data

US 2023/0221215 A1 Jul. 13, 2023

Related U.S. Application Data

(63) Continuation of application No. 16/248,132, filed on Jan. 15, 2019, now Pat. No. 11,573,156.

(51) Int. Cl.
*G01N 1/06* (2006.01)
*G01N 1/08* (2006.01)
(Continued)

(52) U.S. Cl.
CPC ............... *G01N 1/06* (2013.01); *G01N 1/08* (2013.01); *G21C 17/06* (2013.01);
(Continued)

(58) Field of Classification Search
CPC .............. G01N 2001/2873; G01N 2001/2092
See application file for complete search history.

(56) References Cited

U.S. PATENT DOCUMENTS 3,383,131 A 5/1968 Rosfelder
3,554,018 A 1/1971 Anderson et al.
(Continued)

FOREIGN PATENT DOCUMENTS

EP 1350596 A1 10/2003
EP 2120033 B1 1/2016
(Continued)

OTHER PUBLICATIONS

English_translation_of_JP_2008202986_A_I (Year: 2008).*
(Continued)

*Primary Examiner* — Tran M. Tran
(74) *Attorney, Agent, or Firm* — K&L Gates LLP

(57) ABSTRACT

A method of sampling a multi-layered material and a microsampling tool are described. The sampling method includes penetrating a top surface of a material in a component of interest with a micro-cutting tool to a predetermined depth sufficient to include each layer of the multi-layered material and a portion of the base, without cutting through the full depth of the base, under-cutting from the depth of penetration through the base to define a micro-sample of the multi-layered material, and removing the micro-sample with each layer of the multi-layered material intact. The microsampler includes a cutting tool calibrated to cut to a depth no greater than 2 mm, and in some aspects, no greater than 200 microns into a multi-layered material, the material having a top surface and a metallic or ceramic base and a container for removing and storing a micro-sample cut from the material with each layer of the multi-layered material and a portion of the base intact.

34 Claims, 8 Drawing Sheets

(51) Int. Cl.
*G21C 17/06* (2006.01)
*G01N 1/10* (2006.01)

(52) U.S. Cl.
CPC . *G01N 2001/063* (2013.01); *G01N 2001/066* (2013.01); *G01N 2001/1037* (2013.01)

(56) References Cited

U.S. PATENT DOCUMENTS

| | | | |
|---|---|---|---|
| 3,968,695 | A | 7/1976 | Weiss et al. |
| 4,754,655 | A | 7/1988 | Parker, III et al. |
| 4,809,790 | A | 3/1989 | Manchak, Jr. |
| 4,845,896 | A | 7/1989 | Mercaldi |
| 4,856,233 | A | 8/1989 | Mercaldi |
| 5,038,623 | A | 8/1991 | Zeh |
| 5,408,883 | A | 4/1995 | Clark, Jr. et al. |
| 5,433,121 | A | 7/1995 | Torra et al. |
| 5,445,229 | A | 8/1995 | Delima |
| 5,449,048 | A | 9/1995 | Thigpen et al. |
| 5,492,021 | A | 2/1996 | Bourgeois et al. |
| 5,541,968 | A | 7/1996 | Brassel |
| 5,566,576 | A | 10/1996 | Sher et al. |
| 5,957,019 | A | 9/1999 | Hanaas |
| 6,809,283 | B2* | 10/2004 | Kowdley ............... G21C 17/01 219/69.11 |
| 6,966,236 | B2* | 11/2005 | Charters ................ G01N 1/08 73/866 |
| 7,124,841 | B2 | 10/2006 | Wada et al. |
| 7,304,301 | B1* | 12/2007 | Pop ...................... G01N 23/225 250/307 |
| 7,420,165 | B1* | 9/2008 | Pop ........................ G21C 17/00 250/307 |
| 8,011,454 | B2 | 9/2011 | Castillo |
| 8,538,697 | B2* | 9/2013 | Russell .................... B28D 1/22 702/6 |
| 8,539,846 | B2 | 9/2013 | Crumpton |
| 8,661,922 | B2 | 3/2014 | Sales |
| 8,826,751 | B2* | 9/2014 | Wray ..................... G21C 17/017 73/864.41 |
| 9,017,147 | B2 | 4/2015 | Vindler et al. |
| 9,103,750 | B2 | 8/2015 | Chang et al. |
| 9,186,815 | B2* | 11/2015 | Schlough ................ B28D 7/04 |
| 9,312,066 | B2* | 4/2016 | Lancaster-Larocque ..................... B28D 1/02 |
| 9,476,810 | B2* | 10/2016 | Gottlieb ................. G01N 1/286 |
| 10,418,138 | B1* | 9/2019 | Herrmann ................ C25C 3/34 |
| 10,475,542 | B2 | 11/2019 | Byers et al. |
| 10,670,746 | B2 | 6/2020 | Hill |
| 11,295,869 | B2* | 4/2022 | Rezvoi ..................... C23C 22/08 |
| 11,948,700 | B2* | 4/2024 | Charters ................... G01N 1/08 |
| 12,025,539 | B2* | 7/2024 | Olivier ..................... G01N 1/02 |
| 2001/0045511 | A1 | 11/2001 | Moore et al. |
| 2004/0069066 | A1* | 4/2004 | Dust ....................... G01N 29/28 73/644 |
| 2004/0217286 | A1 | 11/2004 | Alani |
| 2004/0256151 | A1 | 12/2004 | Wada et al. |
| 2006/0017016 | A1 | 1/2006 | Tappel |
| 2009/0032178 | A1* | 2/2009 | Feinroth ................. F28F 21/04 156/143 |
| 2009/0141851 | A1 | 6/2009 | Lee et al. |
| 2010/0215148 | A1 | 8/2010 | Torigoe et al. |
| 2010/0300873 | A1 | 12/2010 | Blackwood et al. |
| 2011/0019790 | A1 | 1/2011 | Pop et al. |
| 2011/0296932 | A1 | 12/2011 | Chang et al. |
| 2013/0340936 | A1 | 12/2013 | Giannuzzi |
| 2018/0326590 | A1* | 11/2018 | Masuda ................... B25J 15/04 |
| 2021/0031393 | A1 | 2/2021 | Dong et al. |

FOREIGN PATENT DOCUMENTS

| | | | |
|---|---|---|---|
| EP | 2249140 | B1 | 6/2018 |
| JP | S58093529 | A | 6/1983 |
| JP | H10503278 | A | 3/1998 |
| JP | 2008202986 | A * | 9/2008 ............ G01N 1/286 |
| JP | 2008202986 | A1 | 9/2008 |
| WO | 9527986 | A1 | 10/1995 |
| WO | 2020150355 | A1 | 7/2020 |

OTHER PUBLICATIONS

International Search Report and Written Opinion for International PCT Application No. PCT/US2020/013684, dated May 22, 2020.
Mayer et al., TEM Sample Preparation and FIB-Induced Damage, MRS Bulletin (May 2007), 32:400-407.
European Search Report for corresponding European Patent Application No. 20741095.2, dated Feb. 1, 2023.

* cited by examiner

MINIMALLY INVASIVE MICROSAMPLER FOR INTACT REMOVAL OF SURFACE DEPOSITS AND SUBSTRATES

CROSS-REFERENCE TO RELATED APPLICATIONS

The present application is a continuation application claiming priority under 35 U.S.C. § 120 to U.S. patent application Ser. No. 16/248,132, entitled MINIMALLY INVASIVE MICROSAMPLER FOR INTACT REMOVAL OF SURFACE DEPOSITS AND SUBSTRATES, filed Jan. 15, 2019, now U.S. Pat. No. 11,573,156, which is incorporated by reference herein in its respective entirety.

BACKGROUND OF THE INVENTION

1. Field of the Invention

The invention relates to a method for sampling an intact cross-section of a multi-layered structure, and more particularly, a method for taking micro-samples of the structure.

2. Description of the Prior Art

Many structures used in commercial and scientific processes are made of a structural base material, coated by multiple layers of materials such as interlayers and one or more coating layers. During use, many of these structures may accumulate oxidation layers, or may collect debris and other extraneous matter incident to their function or environment. In addition, some structures may have a finite useful life for carrying out a process. It often is necessary to assess the integrity of these materials or to investigate the nature and/or amount of accumulated extraneous matter to evaluate the continuing efficacy and safety of the structure for carrying out a given process.

For example, in a commercial nuclear reactor, there are numerous fuel rods having a cladding material that contains fuel pellets. Cladding materials are generally comprised of a metal, metal alloy, or a ceramic base layer, or a combination of such layers, covered with one or more coating layers, which may also be a metal, metal alloy, or a ceramic. Most commonly in reactors, water is used as a coolant, so the cladding rods are surrounded in use by water. The integrity of the fuel cladding is of vital importance to the safe operation of the fuel rod assembly. Characterization of irradiated cladding is a necessary but very costly process, because it sometimes requires removal of the entire fuel rod, shipment to and processing in a specialized hot cell facility licensed for irradiated fuel handling. In most cases in the United States, for example, the entire fuel rod has to be removed from the fuel assembly and shipped overseas to a facility licensed to handle irradiated material. The cost can easily meet or exceed one million U.S. dollars. Once at the facility, however, only a very small portion of the harvested cladding is actually characterized.

In other industries, pipes, steam generator or other heat exchanger tubes, pipe-walls, the interiors of reactors and generators, and similar components critical to the operation of a process should be evaluated, but are not because to do so would require removal from service and shutting down operations, which in many facilities is not an option to be taken except in exigent circumstances. In these and similar cases, usually kilograms of samples are removed, shipped and processed, only for several micrograms to nanograms of samples to be actually analyzed.

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, and abstract as a whole.

This invention describes a method of minimally invasive micro-sampling, designed to remove and retain a very small amount (for example, a sample that is ≤2 mm diameter and <200 μm deep) of material from the surface of a component, with the express purpose of maintaining the integrity of any surface deposits or coating and the deposit/substrate interface. Samples removed in this manner can then be shipped from their point of origin to a facility for thorough microstructural characterization using various forms of electron microscopy. Effectively, it is a method of removing a "micro-sample" where the surface of the sample is preserved.

In various aspects, the method generally includes sampling a multi-layered material having a top surface and a metallic or ceramic base. The top surface may, in various aspects, typically include a coating, oxidation layer and deposits. The method includes penetrating a top surface of the material with a micro-cutting tool to a predetermined depth sufficient to include each layer of the multi-layered material and a portion of the base, without cutting through the full depth of the base, under-cutting from the depth of penetration through the base to define a micro-sample of the multi-layered material, and removing the micro-sample with each layer of the multi-layered material intact.

The method may also include penetrating the top surface by making a first cut at a first angle relative to the plane of the top surface and making a second cut at a second angle relative to the plane of the top surface. The angles may each be right angles or may be supplemental angles relative to the top surface. The angles may be angled such that the first and second cuts approach each other. In various aspects, the depth of penetration is adjustable by tooling design. For fuel cladding, it is best to be no greater than half the thickness of the cladding, or about 200 microns.

The step of the step of removing the micro-sample may include drawing the plug into a container, for example by suction, and sealing the container.

The micro-cutting tool may be selected from the group consisting of a micro-diamond wire saw, a micro-focus laser, a micro-core drill, an end drill, a wire electrical discharge machine, and combinations thereof.

In various aspects, the micro-cutting tool may be a micro-diamond wire saw that includes two wire rollers, two wire spools positioned between the rollers, a wire wound for movement around each of the two rollers and each of the spools, wherein the wire moves in a reciprocal manner between the two spools, and a pair of computer controlled guides operatively connected to the spools for directing the moving wire from one wire spool to another, with the depth of the cut set by the distance between and the diameter of the guides.

In various aspects, the micro-cutting tool may be a wire electrical discharge machine in a liquid coolant, such as water. The wire electrical discharge machine may generally include a wire wound for movement around each of two rollers spaced from each other, a pair of computer controlled guides disposed between the rollers for directing the moving wire to a predetermined distance and angle into the top surface of the material to define the degree and angle of penetration and the shape and size of the micro-sample. The guides may move the wire in X and Y planes. In certain aspects, at least one of the guides move the wire in up to three additional planes.

In various aspects, the micro-cutting tool may be an coring end mill that includes a major shank having a top end and a bottom end, a minor shank having a top end and a bottom end, wherein the top end of the minor shank extends from the bottom end of the major shank, and the major shank has a diameter larger than the diameter of the minor shank. The major and minor shanks together define a central bore. The end mill also includes at least one cutter and preferably a plurality of cutters positioned at the bottom end of the minor shank.

The step of penetrating the material using an end mill as the micro-cutting tool includes, for example, rotating the end mill while penetrating the material to cut into the material to the predetermined depth, flowing a coolant downwardly through the central bore toward the material, undercutting through the material by moving the one or more cutters in a perpendicular direction relative to the bore sufficient to free the sample from the material, and simultaneously changing the direction of flow of the coolant upwardly through the bore towards the top of the major shank, and drawing the sample with the coolant flow through the bore upwardly through a filter for capturing the sample.

In certain aspects, a protective layer may be applied to the top surface of the material prior to penetration with the end mill. In certain aspects where the material includes an iron-containing material, the filter may have magnetic properties to secure the sample on the filter.

The end mill may include a plurality of cutters, with each cutter having an internal blade section that extends laterally into the bore and an external blade section that extends outwardly from the minor shank, wherein the length of the internal blades is greater than the length of the external blades and the length of the internal blades is less than the radius of the central bore, thereby defining a central area within the bore that determines the width of the micro-sample.

Also described herein is a micro-sampler that includes in general, a cutting tool designed to cut to a fixed depth into a multi-layered material, wherein the material has a top surface and a metallic or ceramic base, and a container for removing and storing a micro-sample. The fixed depth may be based on the length of the cutting portion of the cutting tool. In various aspects, the cutting depth may be no greater than 2 mm, and in certain aspects, about 1 mm, and in certain aspects, equal to or less than 200 microns. The micro-sample is cut from the material with each layer of the multi-layered material intact. In various aspects, the container may include a chamber, a filter separating the chamber into first and second sections, an inlet channel having one end opening into the first section of the chamber and a second open end for operative connection to a site of interest to be removed by the cutting tool, and a suction port fluidly connected on one end to the second section of the chamber and another end fluidly connected to a suction source. The cutting tool of the micro-sampler may be selected from the group consisting of a micro-diamond wire saw, a micro-focus laser, a micro-core drill, an end drill, a wire electrical discharge machine, and combinations thereof.

BRIEF DESCRIPTION OF THE DRAWINGS

The characteristics and advantages of the present disclosure may be better understood by reference to the accompanying figures.

DESCRIPTION OF THE PREFERRED EMBODIMENTS

Figure 1:
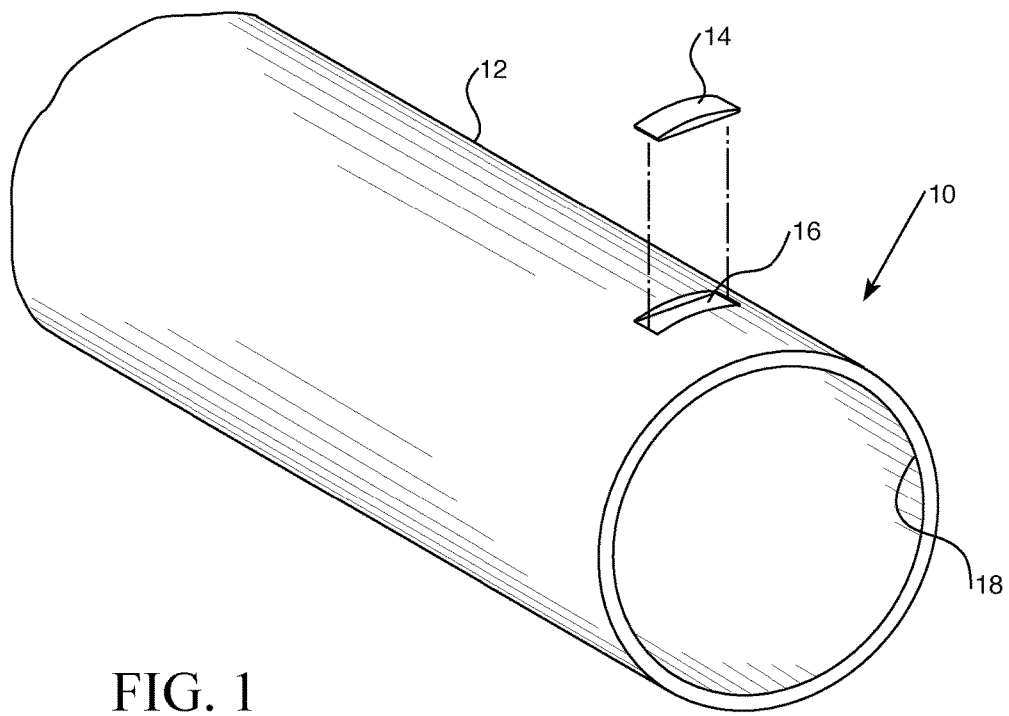
FIG. 1 shows a perspective view of a convex surface, such as a pipe, tube or other structure with a boat-shaped plug removed.

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, upward, down, downward, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

The purpose of the sampling method and cutters described herein is to remove a very small sample from the surface of a component or area of interest. The sample can be any shape, such as boat-shaped, rectangular, cylindrical, cone-shaped, and the like, but is extracted such that all layers of the component, including a portion of the base layer, any intermediate layers, coating layers, and deposits of extraneous matter on the surface of the area of interest remain fully intact and undisturbed. Samples removed in this fashion can then be shipped to an analytical facility where they are characterized using microanalysis techniques such as scanning and transmission electron microscopy. The invention has numerous applications, but it is particularly salient in two cases: 1) highly radioactive specimens such as post-service nuclear fuel cladding, where the cost of extraction, shipment, defueling and sample preparation has heretofore been so costly that it is done for vital programs and exigent circumstances only; and 2) large and/or critical components where removal from service is not an option, such as steam generator tubes, pipe walls, reactor internals, and components of similar systems which would cause noticeable disruptions in critical operations if shut down.

Rather than incur the high cost of mobilization, extraction, shipment, preparation and disposal for analysis of only a minute amount of material, it is better to extract a very small samples which will drastically reduce the overall cost. Doing so will also allow more samples to be withdrawn, and greatly increase the quality of the data obtained by improving sampling statistics.

An exemplary application for the method is to remove small samples from the surface of fuel cladding tubes after service, in order to examine the surface morphology of extraneous matter on the surface of the fuel rod, accident-tolerant coatings, and the extraneous matter, coating, and cladding interfaces. The method described herein will require significantly less mobilization, deployment and shipping costs than heretofore possible because only a very small portion of the sample of interest has to be removed. With the method described herein, only a portion of the outer surface of the base cladding material is removed, reducing the amount of radioactive material in the sample, and thereby eliminating the need to ship the sample to a facility licensed to handle radioactive material. The micro-samples can be tested at a routing testing facility at a significantly reduced cost compared to shipment to a facility licensed to handle radioactive materials.

For convenience, the method will be described for use in removing micro-samples of fuel cladding, but it is not limited to sampling fuel cladding. The invention can be used to obtain samples from virtually any surface, such as pipe walls, steam generator surfaces including tubing in the portion supported by the tube sheet, and internal surfaces of reactors and generators.

A process is described herein where a metallic or ceramic based specimen is sampled on the surface of a component or area of interest in such a way to allow for simultaneous removal of extraneous matter from the surface, such as surface oxides and deposits, together with coating layers, any intermediate layers and some, but not all of the base metal, alloy, or ceramic layer, with all of the layers and extraneous matter, if any, intact. The surface sample should then be extracted, stored and transported in such a way that the deposits and coatings remain attached to the specimen and undisturbed to allow for subsequent observation and characterization.

The various embodiments of sampling depend on the shape and location of the component that needs to be sampled. For example, convex surfaces such as the outer surfaces of fuel rods and pipes, may be sampled using either a micro-diamond wire saw, with a preferred wire diameter ≤150 µm, or a combination of plunge and wire electrical discharge machining (EDM). The micro-diamond wire saw operation can be performed in air, with water providing cooling, or with parts immersed in water. When wire EDM sampling is used, the process is performed under water.

For samples removed from flat surfaces, such as steam generator manway inserts, large pipe walls, and reactor vessel walls, the cutting tool may be by a combination of plunge and wire EDM, micro-focus lasers to oblate material around the region of interest and perform the final cutting to free the sample, or micro-core drills end mills to machine a post which is then removed either by retaining the sample in a cavity of the core drill or drawing it away with a suction device. Preferably, micro-focus lasers are operated in air. End mills and core drills may be operational in air or water.

For samples removed from concave surfaces, such as steam generator tubes and the inner diameters of pipe walls, the sampling options include a combination of plunge and wire EDM, micro-focus lasers, and micro core drills and/or end mills.

Referring to FIG. 1, a component of interest 10 having a convex outer surface is shown as a pipe or cladding tube. A micro-sample 14 is shown as having been removed from the surface 12 of the component 10, leaving a notched area 16 in the component 10. The notch 16 does not extend through to the interior 18 of the component 10. The sample 14, in various aspects, may have sloped or beveled edges, as shown, but may be any shape, such as boat-shaped, rectangular, cylindrical, cone-shaped, and the like.

Figure 2:
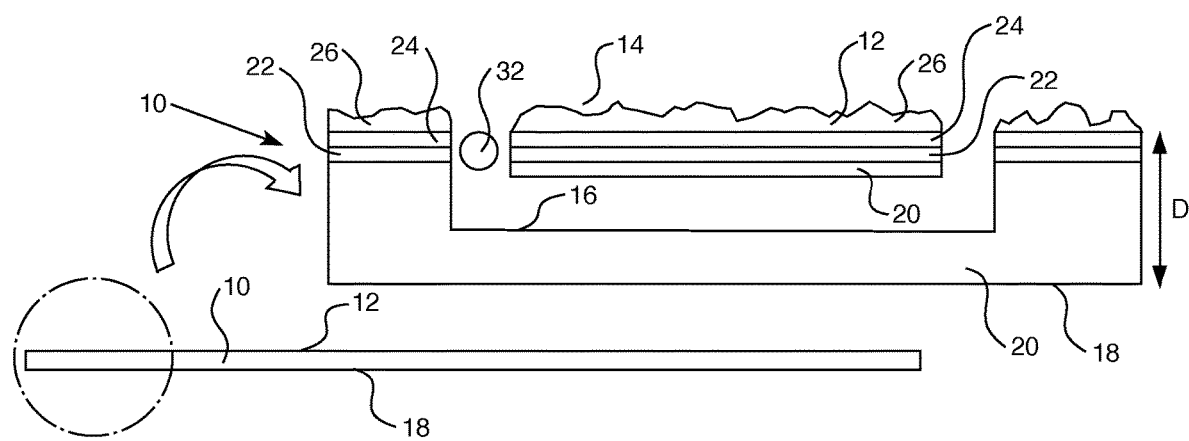
FIG. 2 is a schematic representation of an exemplary portion of a plug of material being cut away from a surface in a structure of interest.

FIG. 2 illustrates a sample 14 taken from a flat surface 12 of a component of interest 10. It should be kept in mind, that because such a small sample is being removed, the surface area to be cut may be substantially flat even though the component as a whole is curved, either convexly or concavely. The area within the dashed circle is blown up to show the layers of the component 10 and sample 14 in detail. The enlarged portion of FIG. 2 illustrates the wire 32 of a cutting tool 30, such as a wire EDM tool or a diamond wire cutter, cutting a sample 14 from component 10. The component 10 includes a base layer 20, which may be a metal, metal alloy, or a ceramic material. The component 10 as shown also includes an intermediate layer 22, a coating layer 24, and surface extraneous matter 26 that has accumulated on the outer surface 12 of component 10. The composition of the layers may be any solid material. The sample 14 is removed so that all of the layers 22, 24, and 26, and some of the base layer 20 are maintained intact, arranged in the same manner as the layers had been before removal. In components such as nuclear cladding tubes, it is important that only a portion of the base layer 20 is removed, so that the depth of the sample 14 is less than the depth, D, of component 10. In this way, the radioactive contamination on the interior 18 of the cladding tube where the fuel pellets are housed will remain sealed per design and will not enter into the surrounding area like the spent fuel pool.

Figure 3:
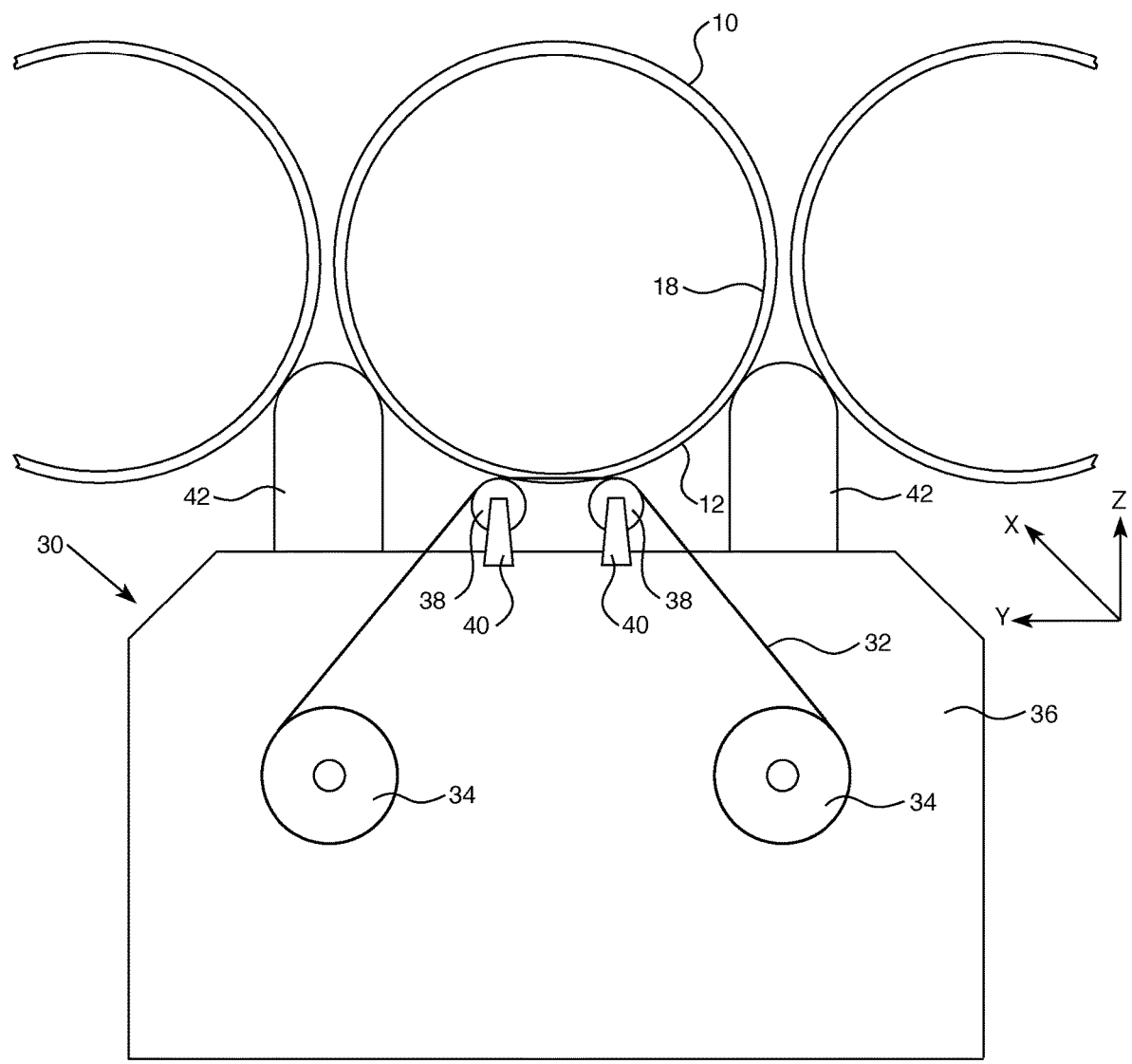
FIG. 3 is a schematic representation of the diamond wire saw coming into contact with a surface for removal of a portion.

Referring to FIG. 3, an embodiment of a cutting tool 30 in the form of a modified diamond wire saw is shown. The wire 32, which is constantly fed from one of the spools 34, is held between rollers 38 of computer numerical controlled (CNC) guides to move in the x-y plane. One of the guides may optionally also move independently in three axes, giving rise to the ability to cut tapered and transitioning shapes, such as a boat-shaped, v-shaped, cylindrical or rectangular cut. Other shapes, may be programmed into the computer. The rollers 38 may be directly or operatively connected to the computer controlled guides for directing the moving wire from one wire roller 38 to another, with the depth of the cut set by the distance between and the diameter of the guides. The rollers 38 and guides can control axis movements in multiple directions, allowing the diamond wire saw to be programmed to cut predetermined very small intact pieces of an area of interest in component 10. In the embodiment shown, the wire 32 is wound between two spools 34. The spools 34 rotate to advance the wire 32 over a pair of roller guides 38 which are mounted on spacer posts 40 that extend from a cassette or housing 36. Alignment guides 42 positioned on each side of component 10 hold the component in place while the diamond wire removes material from the surface 12.

Application of wire EDM in general shares many similarities with diamond wire saw in the delivery mechanism. The wire 32, which may be a thin single-stranded metal wire, made for example of brass, is fed through the area of interest in component 10, submerged in a tank of dielectric fluid, typically deionized water. EDM uses electrical discharges to cut a desired shape from a surface. Material is removed from the work piece by a series of rapidly recurring current discharges between two members that function as electrodes, separated by a dielectric liquid, usually water, and subject to an electric voltage. In various aspects, one of the electrodes is the wire 32 and the other is the component 10. When the voltage between the two electrodes is increased, the intensity of the electric field in the volume between the electrodes becomes greater in certain areas than the strength of the dielectric, thereby allowing current to flow between the two electrodes. As a result, material is removed from the surface 12 of component 10. Once the current stops, new liquid dielectric is usually conveyed into the inter-electrode volume, flushing the debris away and restoring the insulating properties of the dielectric, so that a new liquid dielectric breakdown can occur. Wire EDMs optically follow lines on a master drawing produced by computer numerical controlled (CNC) plotters to provide finely controlled surface cuts. CNC plotters are well known in the art and need not be described in detail. The size, angle and direction of the cuts will be determined in advance and programmed into the computer by suitable known coding techniques to provide predetermined depth, angle, and other relevant measurements for the sample and directions for the guides. Wire EDM does not require high cutting forces for removal of material so is advantageous for controlled removal of micro-sized samples 14.

Figure 4A:
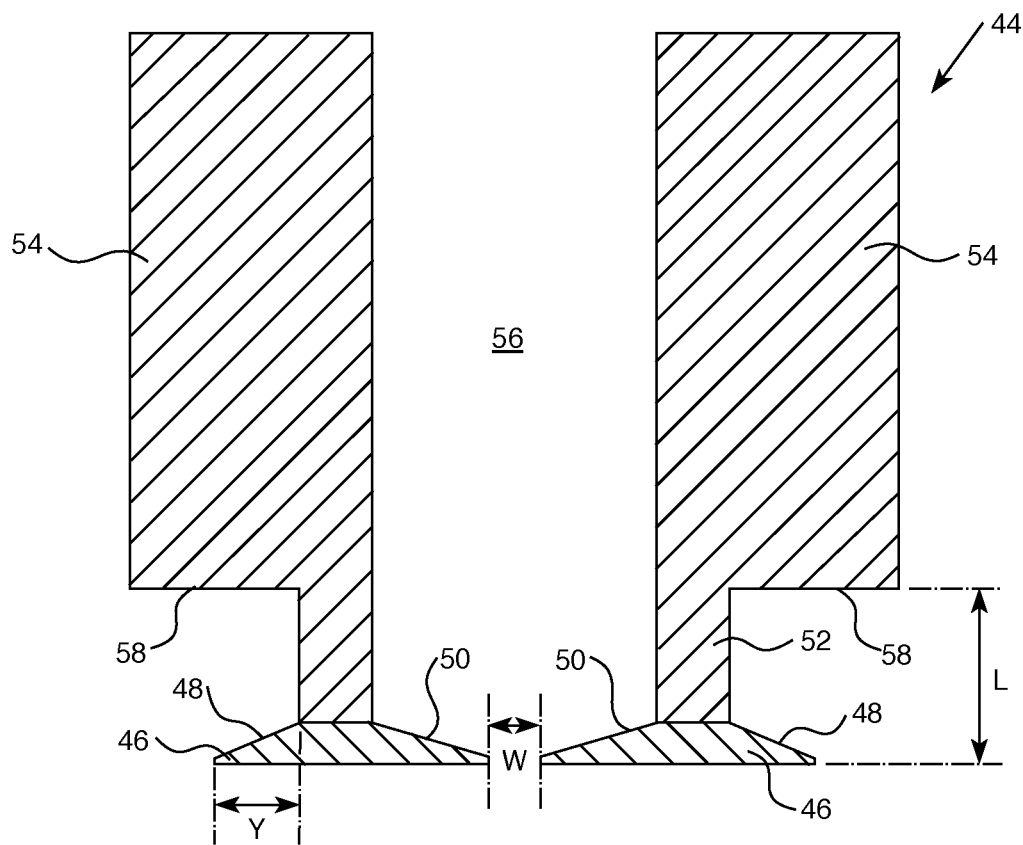
FIGS. 4A and B are schematic cross-sectional side view and end view, respectively, of a dovetail micro-sampling end mill.
Figure 4B:
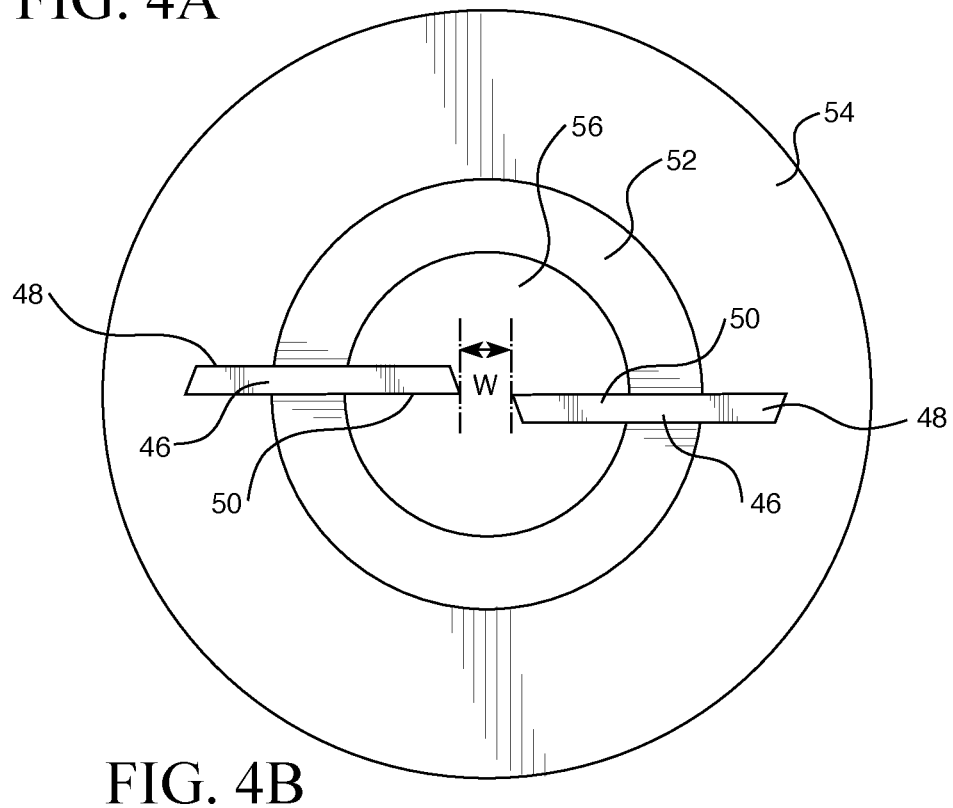

In various aspects, the cutting tool may be a novel coring end mill 44 that allows small surface samples 14 to be removed from a surface 12 of a component 10 without risk of exceeding a predetermined sample depth and without surface damage. Referring to FIGS. 4A and 4B, an embodiment of a micro-sampling end mill 44 includes a major shank 54 and a minor shank 52 which together define an open central bore 56. Cutters 46 are mounted on the bottom end of minor shank 52. Cutters 46 have sharpened cutting edges on all surfaces not attached to the minor shank 54. The cutters 46, in various aspects, are composed of a hard, tough, material such as tungsten carbide that can remove material from the sample 14 without significant wear. The cutters 46 are attached to minor shank 52 such that the cutting surfaces extend beyond the inner and outer diameters of shank 52. In various aspects, the cutters 46 have an outwardly facing blade section 48 and an inwardly facing blade section 50. The number of cutters 46 can vary. The embodiment shown has two cutters, but the number can vary from one to as many as can be fit around the diameter of the minor shank 52.

Figure 5A:
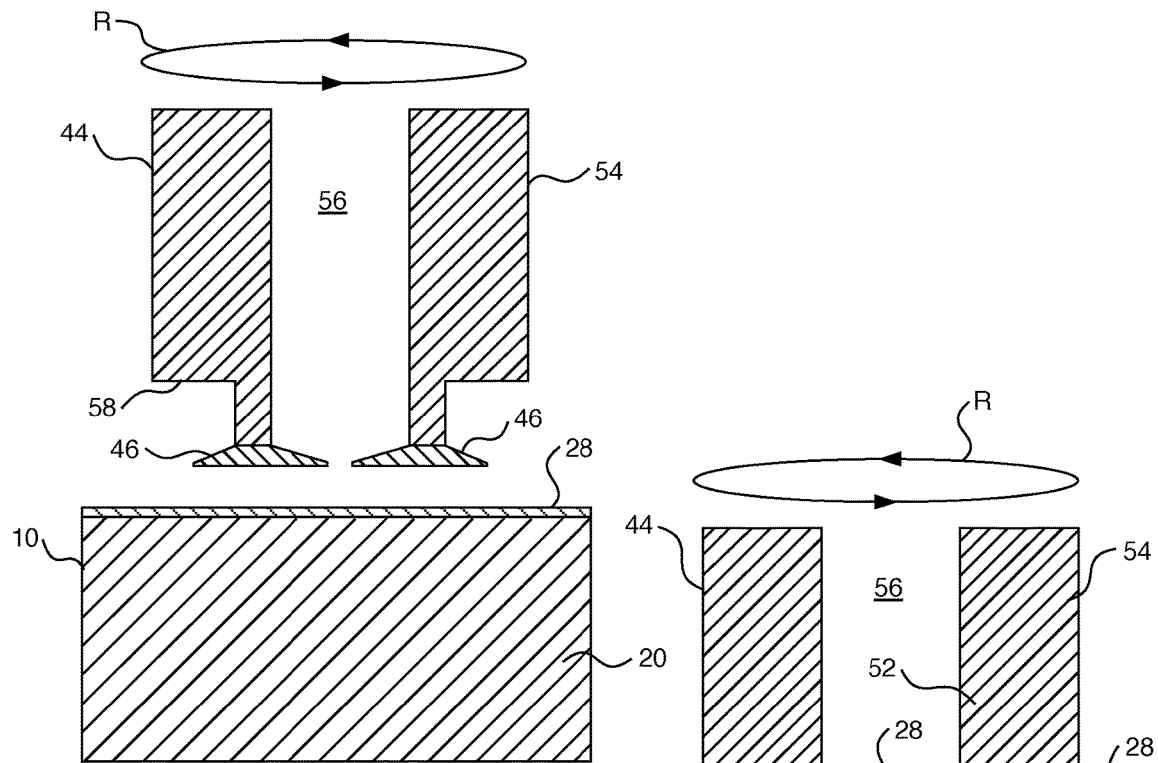
FIGS. 5A-C are a schematic representation of a method of operation of the dovetail micro-sampling end mill of FIG. 4.
Figure 5B:
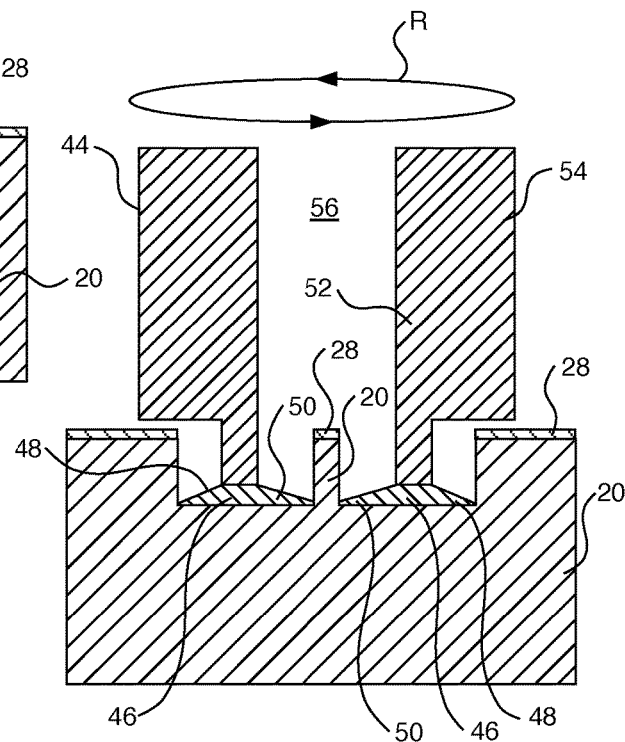
Figure 5C:
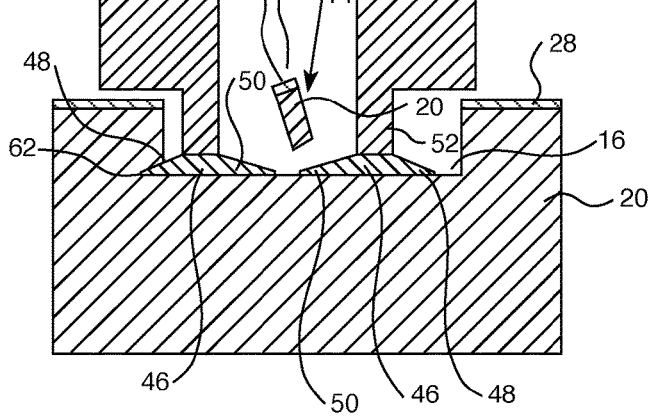

Inwardly facing blades 50 extend only part way into the bore 56 so that a section having a diameter W at the center of the central bore 56 will not be swept by the cutters 46 as the end mill 44 rotates, as shown by rotational motion indicator R in FIGS. 5A-C. The diameter W must be smaller than the distance Y that outwardly extending section 48 of cutter 46 extends from the outer diameter of the minor shank 52. The diameter W is very small, for example less than 1 mm, in keeping with the need to collect only a very small sample 14.

The length of the minor shank 52 is set such that the distance L between the bottom end of the cutters 46 and the bottom flange 58 of major shank 54 determines the maximum depth of sampling. The depth of sampling is small compared to the total thickness D of the component 10 being sampled. The bottom flange 58 of the major shank 54 is not sharpened and cannot perform a cutting function. It must extend radially beyond the end of the cutters 46 so that it represents a barrier to penetration of the tool 30 into the material of component 10. In the case of pressurized water nuclear fuel cladding, the distance L between the end of the cutters 46 and the bottom flange 58 is ideally 0.15 millimeters or less. This allows sufficient remaining cladding wall thickness to retain the integrity of the cladding and prevent egress of the nuclear fuel into the coolant.

Figure 6:
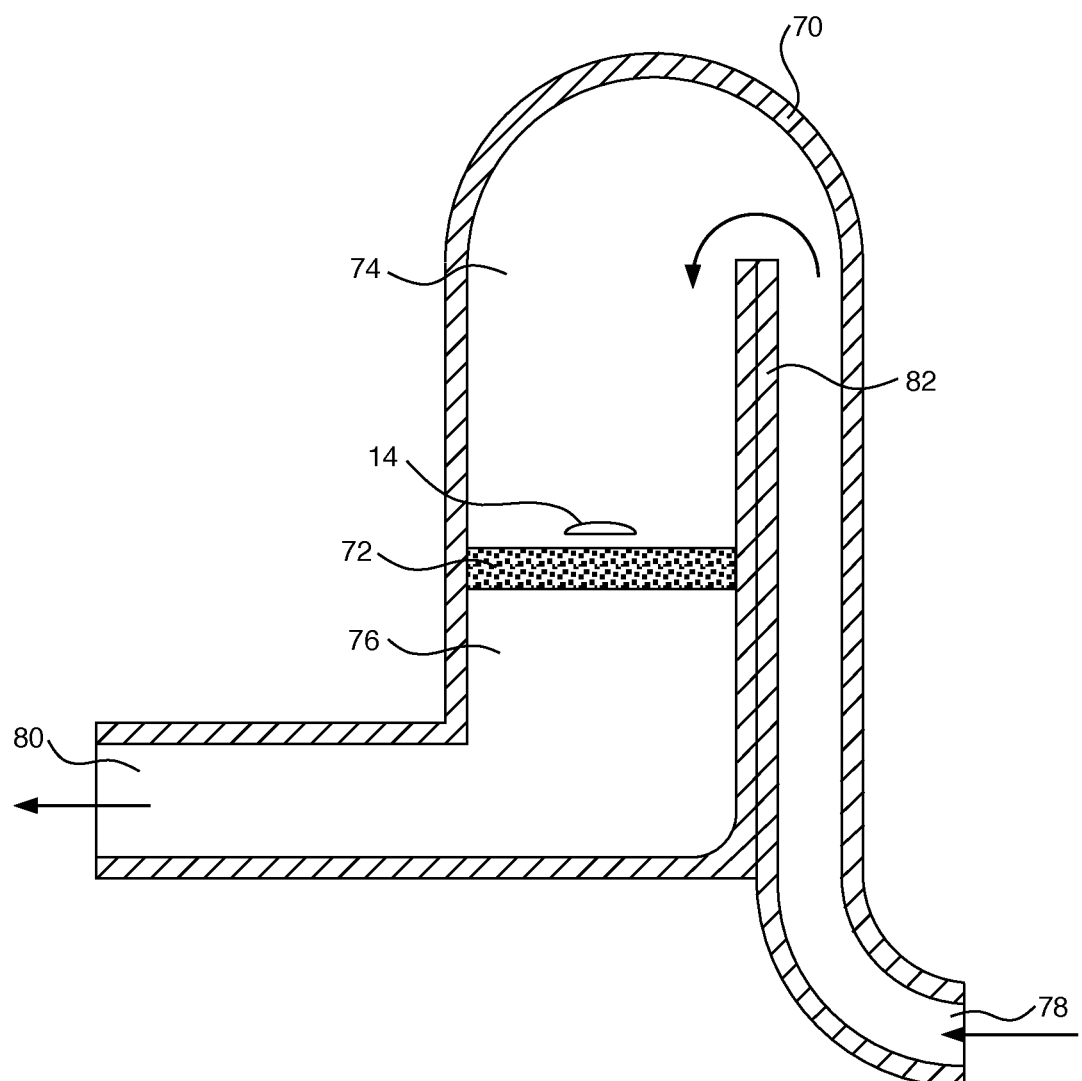
FIG. 6 is a schematic representation of a plug removal and storage device for use with a micro-cutter.

The bore 56 is of sufficient size to allow coolant flow to the cutters 46 and to allow for removal of the micro-sample 14 to a sample collector 70, such as that shown in FIG. 6.

The precise diameter of the major shank 54 can be adjusted and shaped to give more precise depth control on concave, convex, or complex surfaces of interest. Like the wire EDM, the micro end mill cutting tool is preferably computer controlled so that the depth of the penetration of the cutters 46 and shanks 54 and 52 into the material of component 10 and the distance of the perpendicular undercut to free the sample 14 are precisely controlled and conform to predetermined desired sample dimensions.

FIGS. 5A-C illustrate the end mill micro-sampler 44 in use in a cutting operation. In certain aspects, (see FIG. 5A), a thin polymer coating 28 may be applied to the surface 12 to protect it from machine turnings and chips. The polymer is selected to be insoluble in water but easily removed with another solvent that does not harm the sample such as acetone. The end mill 44 is rotated in rotational direction R with coolant flowing downwardly into the bore 56. The coolant direction is initially from the major shank 54 to the cutters 46. The end mill 44 is advanced into the material 20 to be sampled, as shown in FIG. 5 B, producing a sample 14 in the form of a pillar in the central bore 56 of the end mill 44. Once the desired depth is reached, a depth which will be less than the distance L between the bottom end of the cutters 46 and the bottom flange 58 of major shank 54, the direction of coolant flow is reversed with coolant flowing upwardly from the cutter 46 towards the top of major shank 54. The end mill 44 is moved in a direction perpendicular to the surface normal such that blade section 62 cuts into component 10 and blade section 50 cuts into and separates the pillar 14 from base 20 of component 10, as shown in FIG. 5 C. The sample 14 flows upwardly with the coolant flow through the central bore 56 of end mill 44 into a sample collector. The collector, in various aspects, includes a filter or fine mesh screen to capture the sample 14 while allowing the coolant to flow out of the collector. In various aspects, the filter may be made of a magnetic material to better secure samples made from low alloy steel or other magnetic materials on the filter. Following capture of the sample 14, the sample may be washed with a solvent to remove the protective material in those instances where a protective layer had been applied. The collector may then be closed to become a storage and transport container, or may be used to transfer the sample 14 to another container for storage and transport. An exemplary collector is shown in FIG. 6.

Alternative cutting tools 30 may include laser beam machining or laser ablation, which are subtractive processes in which a laser is directed towards the structure of interest. Thermal energy is used to remove material from surfaces. The high frequency of monochromatic light will fall on the surface then heating, melting and vaporizing of the material take place due to impinge of photons. There are many different types of lasers including gas, solid states lasers, and excimers. Ablation is removal of material from the surface of an object by vaporization, chipping, or other erosive processes. The material removed from the surface 12 of component 10 would be around the area that is intended to be sample 14, so that the layers of sample 14 would remain intact as material around it is ablated. When the surrounding material is removed, the remaining plug of material can be undercut, freeing it from attachment to component 10. As with the other examples, only a very small section of component 10 is removed and all layers are removed intact. Any of the cutting tools described herein are preferably computer controlled so that the depth of the penetration into the material of component 10 and the distance of the under-cut to free the sample 14 are precisely controlled and conform to predetermined desired sample dimensions.

The choice of sample 14 cutters will vary depending on the nature of the component being sampled. However, the method, regardless of the embodiment of cutter used cuts the surface deposits, oxides, coatings, intermediate layers, if any, and a portion of the base material together, without disturbing the surface deposits and layers. In various aspects, the sample target dimension are less than 200 μm deep and less than or equal to 2 mm in length and width. Those skilled in the art will recognize that the exact size of the sample 14 can be varied depending on the specific need, planned testing, and the size of component being sampled.

In various aspects, the method includes extraction, retention and storage of multiple samples 14 without damage, using, for example, a sample keeper that is incorporated with or may be attached to the cutting tool in a single unit. A method of capturing and storing the micro-samples 14 removed from the components or areas of interest 10 so that the layers of removed samples 14 are not damaged may optionally be added to the method of sampling.

FIG. 6 illustrates an exemplary extraction, retention and storage chamber 70. Chamber 70 includes an upper section 74 separated from a lower section 76 by a fritted glass, fine mesh screen, or other suitable filter membrane 72. An inlet 78 would, in use, be connected to the cutting tool of choice. A suction port 80 is releasably connected to any suitable suction source (not shown). Continuous suction can be, for example, by a remote pump through a tube attached to port 80. In the embodiment shown in FIG. 6, a wall 82 separates inlet 78 from upper section 74. The inlet 78 may include an intake nozzle (preferably no more than ¼" in its inner diameter) which would be positioned in very close proximity to the sampling site.

In use, inlet 78 or an intake nozzle connected to inlet 78 may be fluidly connected to top of bore 56 (for example, either directly or indirectly connected through conduits or other means such that fluid flows between the inlet 78 and bore 56) of end mill 44 shown in FIG. 4, or proximate the area adjacent to wire 32 between guides 42 in the wire EDM shown in FIG. 3. When a sample 14 is cut from a component 10, a vacuum is pulled through suction port 80 sufficient to draw the sample 14 and any coolant in which the sample 14 is carried from the cutting tool through inlet 78, over wall 82 and into upper section 74 of chamber 70, but gently enough to avoid damage to the layers and any extraneous matter on sample 14. Filter 72 captures sample 14, preventing it from being drawn into lower section 76 or through port 80. The coolant, if any, passes through filter 72. Upon capture, the vacuum is stopped, port 80 released from the vacuum source and closed, and inlet 78 is removed from the cutting tool and closed. The sample 14 would be retained, intact in chamber 70 and delivered to the appropriate testing facility. As stated above, in instances where the sample surface was coated with a protective layer, the protective material would be removed, for example, with a solvent, allowing the solvent to flow through the filter, and retaining the sample 14 on filter 72. Removal of the protective layer may take place before transport or upon arrival at the testing facility.

Figure 7A:
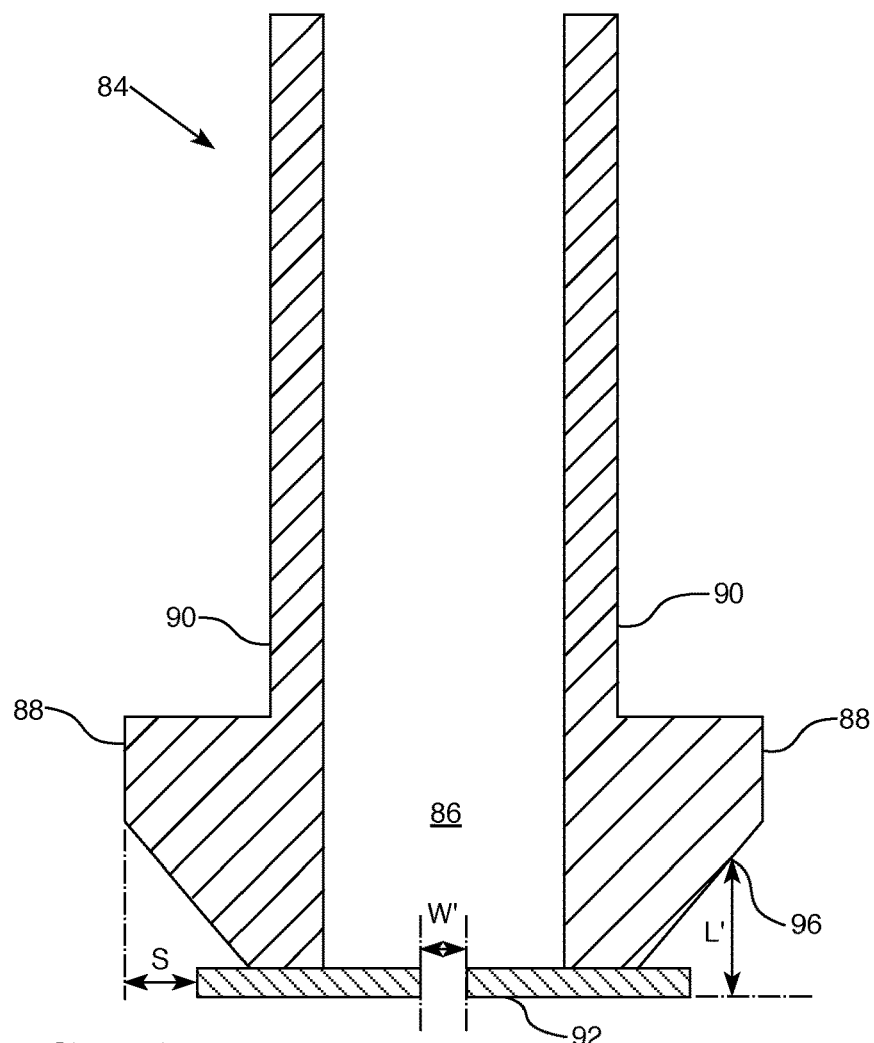
FIGS. 7A-D illustrate an exemplary fluted core drill in side section (A), end (B), and perspective (C) views, and with an optional retaining ring (D).
Figure 7B:
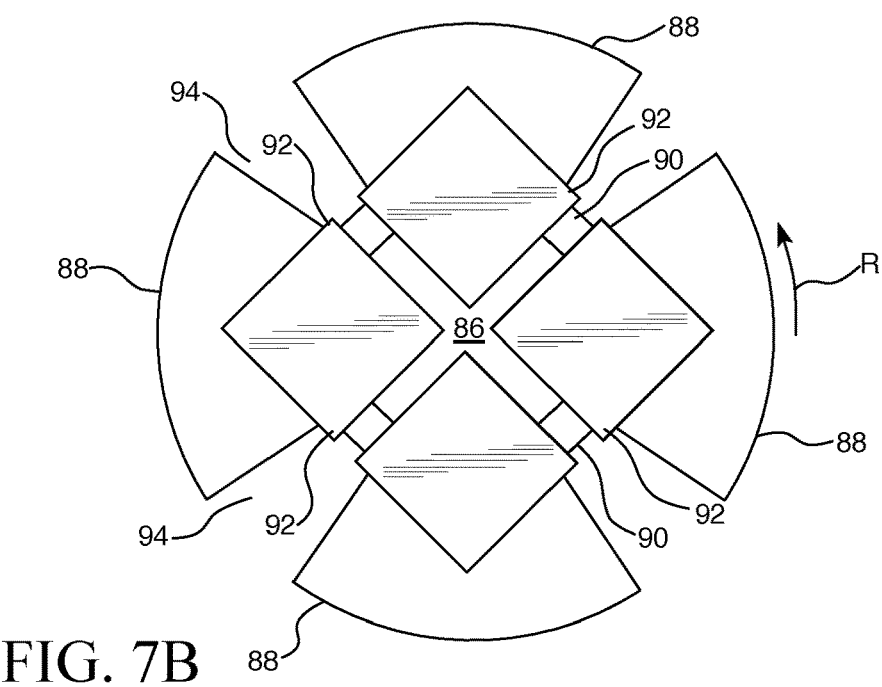
Figure 7C:
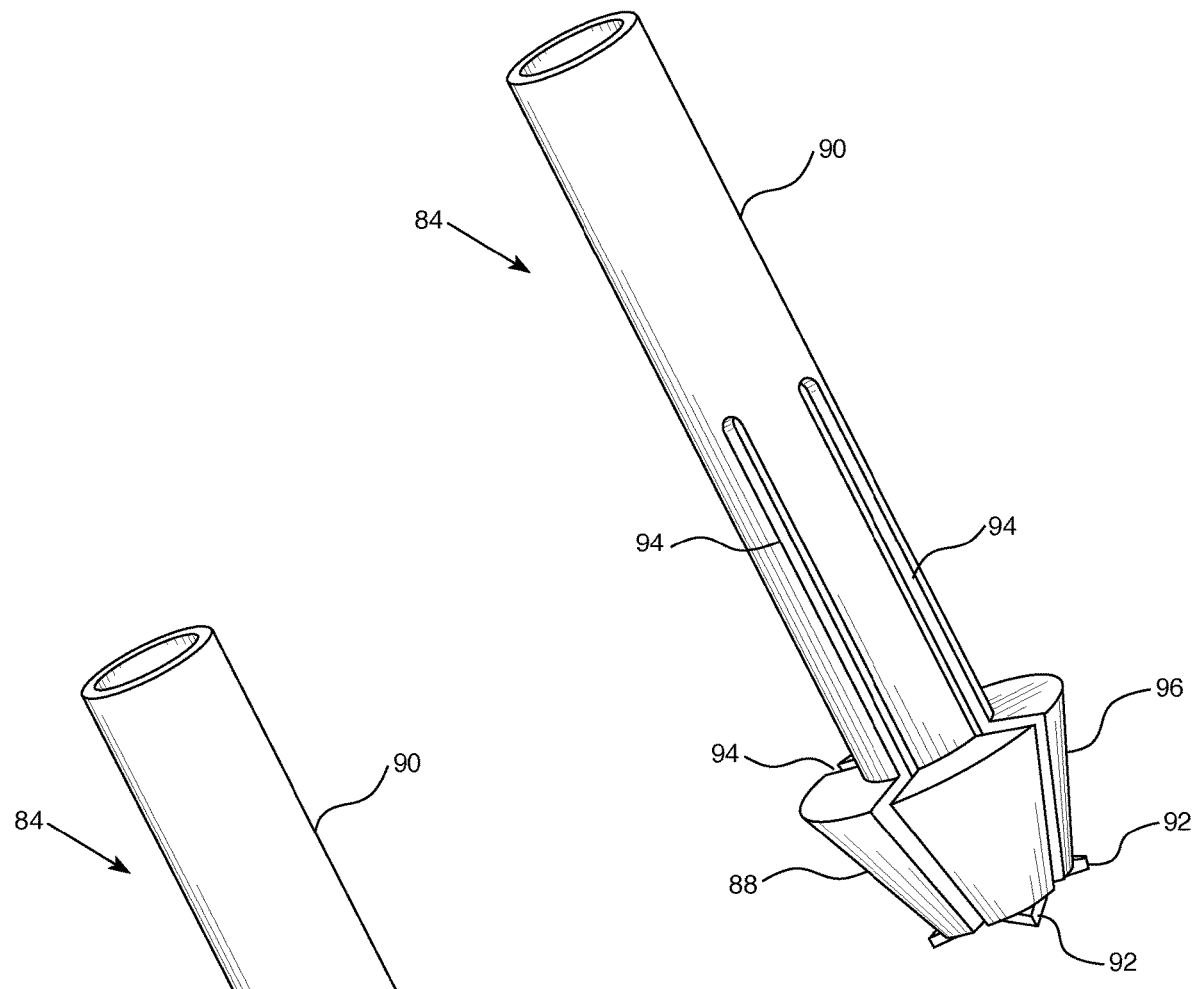

In various aspects, the cutting tool may be a novel flexible flute core drill 84 that allows small surface samples 14 to be removed from a surface 12 of a component 10 without risk of exceeding a predetermined sample depth and without surface damage. Referring to FIGS. 7A, 7B, and 7C, an embodiment of a flexible flute core drill 84 includes a flute collet 88 and a shank 90 which together define an open central bore 92. Cutters 92 are mounted on the bottom end of collet 88. Cutters 92 have sharpened cutting edges on all surfaces not attached to the flute collet 88. The cutting edges may take the form of abrasive particles. The cutters 92, in various aspects, are composed of a hard, tough, material such as diamond imbedded in cobalt that can remove material from the sample 14 without significant wear. The cutters 92 are attached to flute collet 88 such that the cutting surfaces extend beyond the inner diameter of flute collet 88. The cutters 92 must also extend to or beyond the outer diameter of the flute collet 88. The number of cutters 92 can vary. The embodiment shown has four cutters, but the number can vary from two to as many as can be fit around the diameter of the flute collet 88.

The inwardly facing portion of the cutters 92 extend only part way into the bore 86 so that a section having a diameter W' at the center of the central bore 86 will not be swept by the cutters 92 as the drill 84 rotates, as shown by rotational motion indicator R in FIGS. 8 A-C. The diameter W' divided by two must be smaller than the distance S between the outer portion of cutter 92 and the outer diameter of the flute collet 88. The diameter W' is very small, for example less than 1 mm, in keeping with the need to collect only a very small sample 14.

The angle of the of the sloping face 96 of the collet 88 is set such that the cutters 92 meet at the center of core drill rotation after a distance L' between the bottom end of the cutters 92 and the flute collet 88 is traversed. This distance is the maximum depth of sampling. The depth of sampling is small compared to the total thickness D of the component 10 being sampled. The outer surface of the flute collet 88 is not sharpened and cannot perform a cutting function. It must extend radially outward beyond the end of the cutters 92 so that it represents a barrier to penetration of the tool 84 into the material of component 10 once the cutters 92 have met at the center of rotation. In the case of pressurized water nuclear fuel cladding, the distance L' between the end of the cutters 92 and the flute collet 88 when the cutters 92 have met at the center of rotation is ideally 0.15 millimeters or less. This allows sufficient remaining cladding wall thickness to retain the integrity of the cladding and prevent egress of the nuclear fuel into the coolant.

Figure 7D:
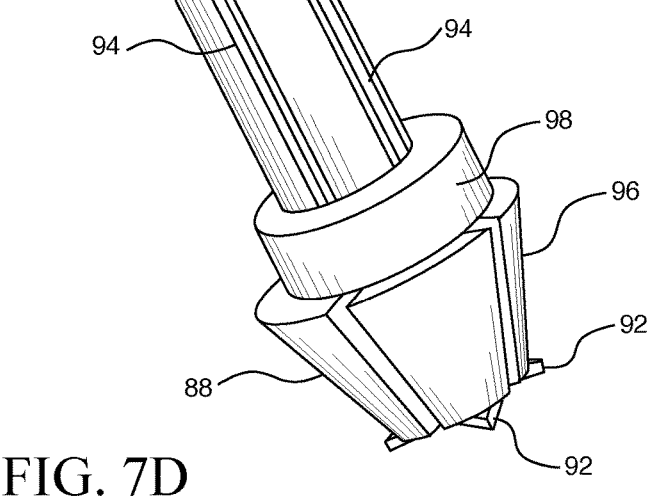

Both the flute collet 88 and shank 90 are slotted to add flexibility. The slots 94 are to be wide and long enough to allow movement of the cutters to the center of tool rotation. A retaining ring 98, as shown in FIG. 7D, may be added to the shank 90 above the collet flute to prevent the distance between the cutters 92 from increasing as the tool 84 is used.

The bore 86 is of sufficient size to allow coolant flow to the cutters 92 and to allow for removal of the micro-sample 14 to a sample collector 70, such as that shown in FIG. 6.

The thickness of the cutters 92 and the angle of the flute collet 88 can be adjusted and shaped to give more precise depth control on concave, convex, or complex surfaces of interest. Like the diamond saw, wire EDM, and the micro end mill cutting tools, the flexible flute core drill 84 may be computer controlled so that the speed of the penetration of the cutters 92 and collet 88 and shank 90 into the material of component 10 is precisely controlled, optimizing the cutting time. However, since both the diameter of the microsampler and the depth of the drill penetration are set by the dimensions of the drill, the flexible flute core drill 84 may be applied with a simple known drive system that does not require a computer.

Figure 8A:
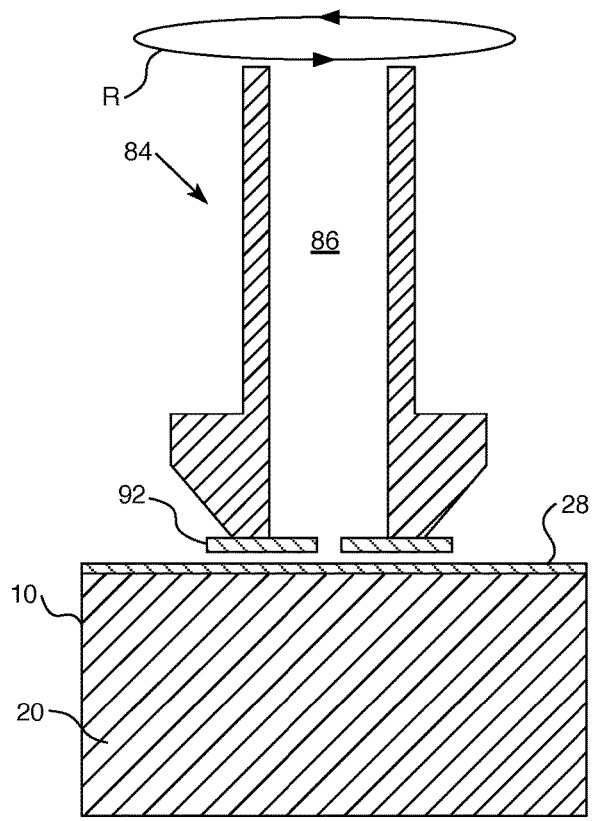
FIGS. 8A-C illustrate the fluted core drill of FIG. 7 in operation cutting a micro-sample from a component.
Figure 8B:
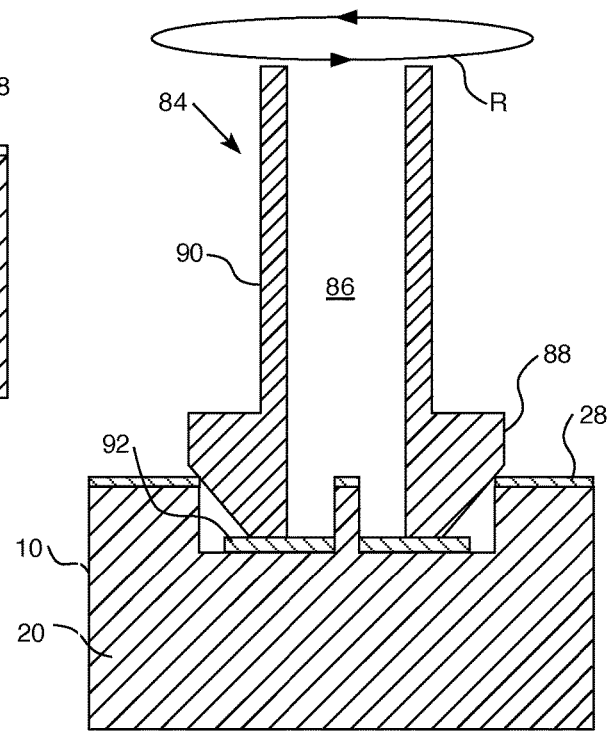
Figure 8C:
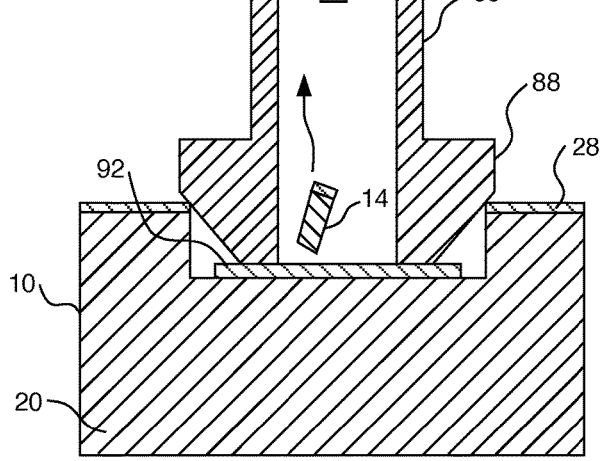

FIGS. 8A-C illustrate the flexible flute core drill 84 in use in a cutting operation. In certain aspects, (see FIG. 8A), a thin polymer coating 28 may be applied to the surface 12 to protect it from machine turnings and chips. The polymer is selected to be insoluble in water but easily removed with another solvent that does not harm the sample such as acetone. The core drill 84 is rotated in rotational direction R with coolant flowing upwardly into the bore 86. The coolant direction is initially from the cutters 92 to the shank 90. The flexible flute core drill 84 is advanced into the material 20 to be sampled, as shown in FIG. 8B, producing a sample 14 in the form of a pillar in the central bore 86 of the core drill 84. Once the desired depth is reached, a depth which will be equal to the distance L' between the bottom end of the cutters 92 and the flute collet 88, the cutters 92 meet at the center of rotation and the micro sample 14 is separated from the component 10 as shown in FIG. 8C. The sample 14 flows upwardly with the coolant flow through the central bore 86 of core drill 84 into a sample collector. The collector, in various aspects, includes a filter or fine mesh screen to capture the sample 14 while allowing the coolant to flow out of the collector. In various aspects, the filter may be made of a magnetic material to better secure samples made from low alloy steel or other magnetic materials on the filter. Following capture of the sample 14, the sample may be washed with a solvent to remove the protective material 28 in those instances where a protective layer had been applied. The collector may then be closed to become a storage and transport container, or may be used to transfer the sample 14 to another container for storage and transport. An exemplary collector is shown in FIG. 6.

Alternative cutting tools 30 may include laser beam machining or laser ablation, which are subtractive processes in which a laser is directed towards the structure of interest. Thermal energy is used to remove material from surfaces. The high frequency of monochromatic light will fall on the surface then heating, melting and vaporizing of the material take place due to impinge of photons. There are many different types of lasers including gas, solid states lasers, and excimers. Ablation is removal of material from the surface of an object by vaporization, chipping, or other erosive processes. The material removed from the surface 12 of component 10 would be around the area that is intended to be sample 14, so that the layers of sample 14 would remain intact as material around it is ablated. When the surrounding material is removed, the remaining plug of material can be undercut, freeing it from attachment to component 10. As with the other examples, only a very small section of component 10 is removed and all layers are removed intact. Any of the cutting tools described herein are preferably computer controlled so that the depth of the penetration into the material of component 10 and the distance of the under-cut to free the sample 14 are precisely controlled and conform to predetermined desired sample dimensions.

The choice of sample 14 cutters will vary depending on the nature of the component being sampled. However, the method, regardless of the embodiment of cutter used cuts the surface deposits, oxides, coatings, intermediate layers, if any, and a portion of the base material together, without disturbing the surface deposits and layers. In various aspects, the cutting depth may be no greater than 2 mm, and in certain aspects, about 1 mm, and in certain aspects, equal to or less than 200 microns. In various aspects, the sample target dimension are less than 200 µm deep and less than or equal to 2 mm in length and width or diameter, depending on the cutting tool used and the thickness of the component 10. Those skilled in the art will recognize that the exact size of the sample 14 can be varied depending on the specific need, planned testing, and the size of component being sampled.

In various aspects, the method includes extraction, retention and storage of multiple samples 14 without damage, using, for example, a sample keeper that is incorporated with or may be attached to the cutting tool in a single unit. A method of capturing and storing the micro-samples 14 removed from the components or areas of interest 10 so that the layers of removed samples 14 are not damaged may optionally be added to the method of sampling.

The method described herein significantly reduces the cost of cladding analyses, including the characterization of lead test assembly, dissolved hydrogen measurements, and measurement of cladding oxide thickness in conventional cladding. The method can be used to supplant what is referred to as fuel crud scraping products. Currently, the cost of mobilization, extraction and shipping are prohibitive. This method of micro-sampling can significantly reduce those costs, making crud scrapes a more attractive proposition for nuclear power plant operations. Easier and lower costs associated with sampling would allow cladding analysis to assess the safety of moving spent fuel from spent fuel pools to dry storage facilities, and allow corrosion analysis on various alloys for utilities.

The method and cutting tools described herein remove minute quantities from the surface of interest of a component with the purpose of keeping the surface layers and interfaces intact and undisturbed. The method also may include steps and devices to capture and store the micro-samples, all without disturbing any surface deposits and oxides.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A method of sampling a multi-layered material, the multi-layered material having a top surface and a base layer, the base layer made of nuclear cladding material, the method comprising:
   penetrating the top surface of the multi-layered material with a micro-cutting tool to a predetermined depth sufficient to include each layer of the multi-layered material and a portion of the base layer made of nuclear cladding material, without cutting through the full depth of the base layer of nuclear cladding material;
   under-cutting from the depth of penetration through the base layer of nuclear cladding material to define a micro-sample of the multi-layered material; and
   removing the micro-sample from the multi-layered material such that each layer of the multi-layered material defined by the micro-sample remains intact.

2. The method recited in claim 1 wherein the depth of penetration is no greater than 2 mm.

3. The method recited in claim 1 wherein the depth of penetration is no greater than 200 microns.

4. The method recited in claim 1 wherein penetrating the top surface comprises making a first cut at a first angle relative to the plane of the top surface and making a second cut at a second angle relative to the plane of the top surface.

5. The method recited in claim 4 wherein the first and second angles are right angles.

6. The method recited in claim 4 wherein the surface is flat and the first and second angles are supplemental angles relative to the surface.

7. The method recited in claim 1 wherein the step of removing the micro-sample comprises drawing the micro-sample into a container and sealing the container.

8. The method recited in claim 7 wherein the micro-sample is drawn into the container by suction.

9. The method recited in claim 1 wherein the top surface is curved and the penetrating and under-cutting are performed simultaneously through an arc of the curve.

10. The method recited in claim 9 wherein the micro-cutting tool comprises a wire electrical discharge machine in a liquid coolant.

11. The method recited in claim 10 wherein the wire electrical discharge machine comprises a wire wound for movement around each of two rollers spaced from each other, a pair of computer controlled guides disposed between the rollers for directing the moving wire to a predetermined distance and angle into the top surface of the material to define the angle and depth of penetration and the shape and size of the micro-sample.

12. The method recited in claim 11 wherein the coolant is water.

13. The method recited in claim 11 wherein the guides move the wire in X and Y planes.

14. The method recited in claim 13 wherein at least one of the guides move the wire in up to three additional planes.

15. The method recited in claim 9 wherein the micro-cutting tool comprises a micro-focus laser.

16. The method recited in claim 9 wherein the top surface is convex.

17. The method recited in claim 16 wherein the micro-cutting tool comprises a micro-diamond wire saw, and the tool further comprises a wire wound for movement around each of two rollers spaced from each other, a pair of computer controlled guides disposed between the rollers for directing the moving wire to a predetermined distance and angle into the top surface of the material to define the angle and depth of penetration and the shape and size of the micro-sample.

18. The method recited in claim 17 wherein the diameter of the wire in the micro-diamond wire saw is less than or equal to 150 microns.

19. The method recited in claim 9 wherein the top surface is concave.

20. The method recited in claim 1 wherein the multi-layered material is a portion of a nuclear cladding tube.

21. A micro-sampler comprising:
   a cutting tool calibrated to cut to a depth less than half the thickness of a multi-layered material, the multi-layered material having a top surface and a base layer of nuclear cladding material; and
   a container for removing and storing a micro-sample cut from the multi-layered material, the micro-sample to be cut from the multi-layered material, by the cutting tool, such that each layer of the multi-layered material and a portion of the base layer of nuclear cladding material defined by the micro-sample remain intact.

22. The micro-sampler recited in claim 21 wherein the container comprises:
   a chamber;
   a filter separating the chamber into first and second sections;
   an inlet channel having one end opening into the first section of the chamber and a second open end for operative connection to a site of interest to be removed by the cutting tool; and,
   a vacuum port fluidly connected on one end to the second section of the chamber and another end fluidly connected to a vacuum source.

23. The micro-sampler recited in claim 21 wherein the cutting tool is a micro-diamond wire saw.

24. The micro-sampler recited in claim 23 wherein the micro-diamond wire saw comprises:

two wire spools;

two wire rollers positioned on a path between the two spools;

a wire wound for movement around each of the two spools and the two rollers, wherein the wire moves in a reciprocal manner between the two rollers; and the rollers being operatively connected to computer controlled guides for directing the moving wire from one wire roller to another, with the depth of the cut set by the distance between and the diameter of the guides.

25. The micro-sampler recited in claim 21 wherein the cutting tool is a wire electrical discharge machine comprising:

two rollers spaced from each other;

a wire wound for movement around each of the two rollers;

a pair of computer controlled guides disposed between the two rollers for directing the moving wire to a predetermined distance and angle into the top surface of the material to define the shape and size of the micro-sample; and a liquid coolant surrounding the wire and a site of interest to be removed.

26. The micro-sampler recited in claim 25 wherein the guides move the wire in X and Y planes.

27. The micro-sampler recited in claim 26 wherein at least one of the guides move the wire in up to three additional planes.

28. The micro-sampler recited in claim 21 wherein the cutting tool calibrated to cut to a depth up to 2 mm.

29. The micro-sampler recited in claim 21 wherein the cutting tool calibrated to cut to a depth less than or equal to 200 microns.

30. The method recited in claim 1, wherein the top surface includes an oxidation layer on the base layer of nuclear cladding material.

31. The micro-sampler of claim 21, wherein the top surface includes an oxidation layer on the base layer of nuclear cladding material.

32. A method of sampling a nuclear fuel element, the nuclear fuel element having a cladding layer, an oxidation layer on the cladding layer, and a deposit layer on the oxidation layer, the method comprising:

penetrating through the deposit layer, the oxidation layer, and a portion of the cladding layer with a cutting tool to a predetermined depth;

under-cutting from the depth of penetration through the cladding layer to define a sample of the nuclear fuel element; and removing the sample from the nuclear fuel element.

33. The method recited in claim 32, wherein the sample is removed from the nuclear fuel element with the cladding layer, the oxidation layer, and the deposit layer of the sample arranged in the same manner as before their removal.

34. The method recited in claim 32, wherein the sample is removed from the nuclear fuel element with the cladding layer, the oxidation layer, and the deposit layer of the sample intact.

* * * * *